(12) United States Patent
Belanger et al.

(10) Patent No.: US 6,805,908 B2
(45) Date of Patent: Oct. 19, 2004

(54) COATING PROCESS FOR ETCHED-LOOK LABEL

(75) Inventors: Jonathan D. Belanger, Henderson, NV (US); William W. Roberts, Campbellville (CA); John Yamasaki, Anaheim, CA (US)

(73) Assignee: Multi-Color Corporation, Cincinnati, OH (US)

( * ) Notice: Subject to any disclaimer, the term of this patent is extended or adjusted under 35 U.S.C. 154(b) by 72 days.

(21) Appl. No.: 10/122,110

(22) Filed: Apr. 15, 2002

(65) Prior Publication Data

US 2003/0194541 A1 Oct. 16, 2003

(51) Int. Cl.$^7$ .............................. B05D 1/36; B05D 5/02
(52) U.S. Cl. ...................... 427/258; 427/265; 427/266
(58) Field of Search ................................ 427/258, 262, 427/261, 266, 267, 280, 265; 101/170, 211, 490, 493

(56) References Cited

U.S. PATENT DOCUMENTS

| | | | | |
|---|---|---|---|---|
| 4,464,423 A | * | 8/1984 | LaBianca et al. | |
| 5,085,932 A | * | 2/1992 | Fujita et al. | 428/331 |
| 5,266,377 A | * | 11/1993 | Kinoshita et al. | |
| 5,571,557 A | * | 11/1996 | De Bastiani et al. | 427/152 |
| 5,819,655 A | * | 10/1998 | Dellivenneri et al. | 101/211 |
| 6,001,208 A | * | 12/1999 | Kinoshita et al. | |
| 6,099,944 A | * | 8/2000 | Laprade et al. | 428/32.69 |
| 6,214,424 B1 | * | 4/2001 | Chubb et al. | |
| 6,573,011 B1 | * | 6/2003 | Nair et al. | 430/14 |

FOREIGN PATENT DOCUMENTS

JP          62-32076         *   2/1987

* cited by examiner

*Primary Examiner*—Fred J. Parker
(74) *Attorney, Agent, or Firm*—Greenebaum Doll & McDonald PLLC; Glenn D. Bellamy; Alexander P. Brackett

(57) ABSTRACT

A film, and process for making the same, that can be used as a label and which provides an etched appearance by the application of the combination of at least two layers of coarse-grained inks. A more specific form of the invention is to prepare a heat-shrink over-wrap film label as disclosed and then apply it to a regular glass bottle so as to create the appearance of an all-over etched treatment or a look of etched treatment to specific areas only. According to another more specific version of the invention, a heat-shrinkable overwrap sleeve may be printed as described above with a portion of the finish gradated from a full strength coating on the main body section of the container to a lesser degree in a continuous gradation over to a narrower neck part of the bottle to be covered. When the heat-shrinkable film is applied on a container with a narrow neck, the degree of frost effect remains uniform, being counter-balanced by the lesser application of the frost effect in the area where a higher degree of shrinkage takes place.

25 Claims, No Drawings

COATING PROCESS FOR ETCHED-LOOK LABEL

TECHNICAL FIELD

This invention relates to a process for providing a simulated etched or frosted look to a surface, as well as a product made from this process. More specifically, the invention relates to a coated label film that may be applied to a bottle to simulate the look of an etched or frosted outer surface.

BACKGROUND OF THE INVENTION

A now-popular packaging style for wine and other beverages in glass bottles is to treat the exterior of the bottle with a physical or chemical etching process to create a soft matte or frosted appearance. The etch treatment can be all-over, in a design, or with area(s) omitted for screen printing.

Physical etching is accomplished by sandblasting fine particles against the surface to be decorated. In chemical etching, an acid is applied to react with the glass surface. Either method is laborious, costly, involves the use of harsh chemicals, and produces waste material requiring expensive disposal. Also, some assert that a glass bottle so treated may suffer impaired strength.

The work of others who have addressed this challenge are described in U.S. Pat. Nos. 6,099,944; 5,571,557; and 6,214,424.

SUMMARY OF THE INVENTION

The present invention provides a film that can be used as a label and which is provided with an etched appearance by the application of the combination of at least two layers of inks. These coatings cause light to reflect at random on both layers and creates the effect of a deep frost finish which simulates the effect on the glass currently achieved by the chemical or physical etching process.

A more specific form of the invention is to prepare a heat-shrink over-wrap film label as described above and then apply to a regular glass bottle so as to create the appearance of an all-over etched treatment or a look of etched treatment to specific areas only.

According to another more specific version of the invention, a heat shrink overwrap sleeve may be printed as described above with a portion of the finish gradated from a full strength coating on the main body section of the container to a lesser degree in a continuous gradation over to a narrower neck part of the bottle to be covered. When the heat shrink film is applied on a container with a narrow neck, the degree of frost effect remains uniform, being counter-balanced by the lesser application of the frost effect in the area where a higher degree of shrinkage takes place.

Other details, aspects and features of the invention with respect to both process and product will be described below.

BEST MODE FOR CARRYING OUT THE INVENTION

It is well known to apply labels made of a flexible film substrate to glass and plastic bottles using either a pressure sensitive adhesive or by providing a sleeve over-wrap which is shrunk by application of heat in order to closely conform the film label to the outside shape of the container. Such labeling substrates are usually printed with the desired ornamentation or indicia on an inward side of the label film that is applied toward the container. In this manner, the printing will not be scuffed or marred during manufacture, shipping, handling, or prior to and after sale. Such labels are very durable and present an attractive, relatively glossy appearance.

The treatment of glass with a physical or chemical etching process to create a soft matte etched or frosted appearance is well known. Recently, glass bottles for wine and other beverages have been so treated to provide an attractive look. However, when an adhesive label is applied to such bottles, even when the label is produced from transparent film material, the etched or frosted appearance is lost in the area covered by such a label.

The present invention provides a label and process for making the same which will simulate the etched or frosted appearance when applied to an ordinary glass or plastic container, such as a jar or bottle. Examples of this product and method are set forth below. It should be noted that these examples are representative only and do not represent all ways in which the invention can be practiced. These examples are illustrative of the Applicants' best currently-known mode for carrying out the invention. As used herein, the terms "etched" and "frosted" are used interchangeably and to the extent a difference may be perceived in the trade, it is a difference in degree only.

As an example, a commonly-used label substrate, such as PET or PVC film, may be treated according to the present invention. One side of the film, which is to become the inner side directed toward the glass surface, is provided a coating of coarse-grained translucent ink. This coating is applied in a way that intentionally creates an irregular surface on the film. This layer of ink is preferably provided without color pigment. The coarseness of the finished grain may be created by applying the ink with a coarse grid gravure cylinder. An example of an appropriate application cylinder would be one which is chemically engraved or engraved using a system produced by Think Laboratory Company, Ltd. of Chiba, Japan, having a relatively coarse grid with a cell depth of about 20–40 (20 preferred) microns and a line screen of about 125–200 lines per inch (150 preferred). A preferred ink for this coating may be solvent based Finelap 1285 Clear, manufactured by Sun Chemical Corporation, with an additional about 2–3% by weight of 18–361 silicon powder. One purpose of this inner side coating is to prevent what has been called a "wet t-shirt" look caused by trapped moisture, which may result in distorted color, clarity/opacity, and gloss. In the case of a label being adhesively applied to a surface this inner side coating could be omitted.

The opposite, outer side of the film also may be treated with one or more coatings. Preferably, but optionally, a coating of translucent color solvent based nitrocellulose ink is applied directly to the outer side of the film. Thereafter, a coarse coating of matte ink having a relatively large particle size colorless pigment added thereto, which provides some opacity but not color, is applied to the outer side of the film. In preferred form, this ink may be solvent based Finelap 1285 Matte, made by Sun Chemical Corporation, with the addition of about 5% by weight of 18–355 silicon powder. A high durability ink should be selected for this surface coat. Again, the coarseness of the finished grain of this matte ink is enhanced by application with a gravure cylinder chemically engraved to have a relatively coarse grid. For example, it may have a preferred cell depth of about 40 microns with a line screen of about 150 lines per inch.

As used herein, when referring to the application of a "coarse" or "coarse-grained" coating, it is intended to mean the use of relatively large particle size in the ink or lacquer being applied. In this case, pigment solids sized nearer the larger end of the spectrum of acceptable size are selected. The coarseness of the ink and the manner in which it is applied contribute to its creating a coating of irregular thickness, even to the point of having a slightly textured feel in the case of the outer surface coating. It makes no difference whether the inner or outer coating of ink is applied to the film first, except that if a coating of translucent colored ink is applied to the outer side of the film, it must be applied before the coarse layer of matte ink on the outer surface.

A purpose for providing a coating of pigmented ink on the outer surface of the film prior to application of the coarse-grained colorless matte coating is to provide (1) the appearance that the underlying container is made of a colored material (such as green or brown glass) and/or (2) to simulate the true color of the contained product. For example, if the container is to appear to be that of etched clear glass containing red, white or blush wine, then a color of ink is selected for this layer so as to provide a similar color when used in combination with the coarse coatings of colorless ink on one or both sides of the film label. It has been found that the natural color of the inner product may be distorted or become unattractive when the label of the present invention is used to simulate an etched or frosted look. Substantial compensation for or reversal of this undesired color change may be accomplished by selecting an appropriate color of translucent ink to be applied as described above. Alternatively, a color may be selected which simulates the color of the product as seen through colored glass or to make the glass appear opaque. While this translucent color layer might be applied on the inner side of a transparent film substrate below the inner side coarse-grained coating, it has been found that applying it to the outer side of the film creates a more suitable effect.

A more particular form of the present invention is to use a heat shrinkable film substrate and to form the printed film into a tubular sleeve that can be fitted over and applied to a glass or plastic container, such as a bottle. When such a label is to be applied to a container having a narrowed neck portion (such as a wine bottle), the application of the coatings on the inner and/or outer sides of the film may be gradated in density in proportion to the expected amount of shrinkage in a given area of the label in order to provide a uniform density of the ink coatings and a uniform appearance after shrinkage. In other words, in the areas where the over-wrap sleeve will be subject to a greater degree of shrinkage, the ink coatings should be applied with a proportionately lower density, such that the density of the coatings will be uniform overall after shrinkage. Alternatively, if it is desired to have a finished appearance in which the etched or frosted look fades to a gloss or untreated look on other areas of the finished product, gradation of coating density may be adjusted accordingly.

Another variation of the present invention is to provide areas of the film substrate that are kept free of one or both of the coarse coatings of ink, especially the outer coating, in order to create a cut-out design etch effect. Also, the etch effect may be cut-out to correspond with indicia, which is preferably printed on the inner side of a transparent film substrate, so that the indicia will show through with a gloss or non-etched/frosted effect and be protected from scuffing. In ether case, the appearance imitates that of a genuine etched glass container so presented.

Many variations of the examples as described above may be made without departing from the spirt of the present invention. As such, the scope of patent protection should be limited only by the following claim or claims, interpreted according to accepted doctrines of claim interpretation, including the doctrine of equivalence and reversal of parts.

What we claim is:

1. A process for producing a film covering for providing a simulated etched or frosted appearance when applied to a surface, comprising:
   providing a film substrate having an inner side and an outer side, the inner side to be applied toward the surface being treated;
   applying a coating of translucent ink to the inner side of the film; and
   applying a coating of matte ink to the outer side of the film.

2. A process according to claim 1, further comprising the addition of about 2% to about 5% by weight silicon powder to at least one of the coatings of ink.

3. A process according to claim 2, wherein the ink coatings are applied to the film using a gravure cylinder.

4. A process according to claim 3, wherein the gravure cylinder is engraved to a cell depth of about 20 to about 40 microns and a line screen of about 125 to about 200 lines per inch.

5. A process according to claim 1, further comprising applying a coating of translucent color-pigmented ink on the outer side of the film prior to the coating of matte ink.

6. A process according to claim 5, wherein the color is selected to imitate the appearance of the intended contents of a container to which a label made from the film covering is subsequently to be applied.

7. A process according to claim 5, further comprising the addition of about 2 to 5% by weight silicon powder to at least one of the coatings of ink.

8. A process according to claim 7, wherein the ink coatings are applied to the film using a gravure cylinder.

9. A process according to claim 8, wherein the gravure cylinder is engraved to a cell depth of about 20 to about 40 microns and a line screen of about 125 to about 200 lines per inch.

10. A process according to claim 1, wherein the ink coatings are applied to the film using a gravure cylinder.

11. A process according to claim 10, wherein the gravure cylinder is engraved to a cell depth of about 20 to about 40 microns and a line screen of about 125 to about 200 lines per inch.

12. A process according to claim 1, wherein the film comprises a heat-shrinkable material and is formed into a sleeve for application to the surface of an object by subsequent application of heat to cause the film to closely form to the object which is to be made to have the appearance of being etched or frosted.

13. A process according to claim 12, wherein at least one of the coatings is applied with a gradient of density on at least part of the film such that the resulting density of the coating appears to be substantially uniform after a predetermined non-uniform shrinkage of the film.

14. A process according to claim 1, wherein at least one selected area of the film is excluded from at least the outer side coating in order to provide the appearance of a cut-out pattern of etched or frosted appearance.

15. A process according to claim 1, wherein at least one selected area of the film is excluded from at least the outer side coating and indicia is printed on the inner side of the film corresponding to the selected area such that the indicia will appear through the film without an etched or frosted effect.

16. A process for providing a simulated etched or frosted appearance for a surface, comprising:

provided a substantially transparent film substrate having an inner side and an outer side, the inner side to be applied toward the surface being treated;

applying a coating of translucent ink to the inner side of the film;

applying a coating of matte ink to the outer side of the film;

applying the film to a surface to provide a simulated etched or frosted appearance.

17. A process according to claim 16, further comprising applying a coating of translucent color-pigmented ink on the outer side of the film prior to the coating of matte ink.

18. A process according to claim 17, wherein the color is selected to imitate the appearance of the intended contents of a container to which a label made from the film covering is subsequently to be applied.

19. A process according to claim 16, wherein at least one of the coatings of ink includes about 2% to about 5% by weight silicon powder.

20. A process according to claim 19, wherein the ink applied to the inner side includes about 3% by weight silicon powder and the ink applied to the outer side includes about 5% by weight silicon powder.

21. A process according to claim 19, wherein the coating of ink are applied to the film with a gravure cylinder engraved to a cell depth of about 20 to about 40 microns and a line screen of about 125 to about 200 lines per inch.

22. A process according to claim 16, wherein the film comprises a heat-shrinkable material and is formed into a sleeve for application to the surface of an object by subsequent application of heat to cause the film to closely form to the object which is to be made to have the appearance of being etched or frosted.

23. A process according to claim 22, wherein at least one of the coatings is applied with a gradient of density on at least part of the film such that the resulting density of the coating appears to be substantially uniform after a predetermined non-uniform shrinkage of the film.

24. A process according to claim 16, wherein at least one selected area of the film is excluded from at least the outer side coating in order to provide the appearance of a cut-out pattern of etched or frosted appearance.

25. A process according to claim 16, at least one selected area of the film is excluded from at least the outer side coating and indicia is printed on the inner side of the film corresponding to the selected area such that the indicia will appear through the film without an etched or frosted effect.

* * * * *

UNITED STATES PATENT AND TRADEMARK OFFICE
CERTIFICATE OF CORRECTION

PATENT NO.     : 6,805,908 B2
DATED          : October 19, 2004
INVENTOR(S)    : Belanger et al.

It is certified that error appears in the above-identified patent and that said Letters Patent is hereby corrected as shown below:

Column 1,
Line 27, "challenger are" should be -- challenge is --.

Column 3,
Line 64, "in ether case" should be -- in either case --.

Column 6,
Line 1, "coating" should be -- coatings --.
Line 20, "claim 16, at least" should be -- claim 16, wherein at least --.

Signed and Sealed this

Twelfth Day of July, 2005

JON W. DUDAS
*Director of the United States Patent and Trademark Office*